(12) United States Patent
Favis

(10) Patent No.: US 9,962,831 B2
(45) Date of Patent: May 8, 2018

(54) BIOMIMETIC HUMANOID ROBOTIC MODEL, CONTROL SYSTEM, AND SIMULATION PROCESS

(71) Applicant: Stephen Favis, Sacramento, CA (US)

(72) Inventor: Stephen Favis, Sacramento, CA (US)

(*) Notice: Subject to any disclaimer, the term of this patent is extended or adjusted under 35 U.S.C. 154(b) by 111 days.

(21) Appl. No.: 15/206,066

(22) Filed: Jul. 8, 2016

(65) Prior Publication Data
US 2017/0008166 A1    Jan. 12, 2017

Related U.S. Application Data

(60) Provisional application No. 62/190,148, filed on Jul. 8, 2015.

(51) Int. Cl.
*B25J 9/10* (2006.01)
*B25J 9/16* (2006.01)

(52) U.S. Cl.
CPC .......... *B25J 9/1075* (2013.01); *B25J 9/1095* (2013.01); *B25J 9/1605* (2013.01); *G05B 2219/39454* (2013.01); *G05B 2219/40324* (2013.01)

(58) Field of Classification Search
CPC ...... B25J 9/1075; B25J 9/1605; B25J 9/1095; G05B 2219/39454; G05B 2219/40324
USPC ........................................................ 700/245
See application file for complete search history.

(56) References Cited

U.S. PATENT DOCUMENTS

| | | | | |
|---|---|---|---|---|
| 4,776,852 A * | 10/1988 | Bubic | ................... | A61F 2/68 623/26 |
| 2004/0230090 A1* | 11/2004 | Hegde | ................. | A61M 1/1053 600/18 |
| 2005/0283043 A1* | 12/2005 | Sisk | ....................... | A61H 19/00 600/38 |
| 2006/0041309 A1* | 2/2006 | Massen | ................. | A61F 2/0036 623/14.13 |
| 2009/0317852 A1* | 12/2009 | Parker | .................. | C12N 5/0062 435/29 |
| 2010/0268352 A1* | 10/2010 | Majoe | .................... | B25J 9/1075 623/26 |
| 2010/0324699 A1* | 12/2010 | Herr | .......................... | A61F 2/66 623/27 |
| 2012/0228991 A1* | 9/2012 | Vranish | ................. | B25J 9/1075 310/300 |
| 2013/0310979 A1* | 11/2013 | Herr | ....................... | B25J 9/1694 700/258 |
| 2016/0252111 A1* | 9/2016 | Ball | ....................... | B25J 9/142 92/47 |
| 2016/0326477 A1* | 11/2016 | Fernandez-Alcon | .. | C12M 23/16 |

* cited by examiner

*Primary Examiner* — Jaime Figueroa
(74) *Attorney, Agent, or Firm* — Alexis J Saenz

(57) ABSTRACT

A biomimetics based robot and process for simulation is disclosed. The robot may include filament driven and fluid pumped elastomer based artificial muscles coordinated for slow twitch/fast twitch contraction and movement of the robot by one or more microcontrollers. A process may provide physics based simulation for movement of a robot in a virtual setting. Successfully tested movement data may be stored and embedded into a robot at build and/or before a new movement in programmed into the robot.

18 Claims, 12 Drawing Sheets

BIOMIMETIC HUMANOID ROBOTIC MODEL, CONTROL SYSTEM, AND SIMULATION PROCESS

CROSS-REFERENCE TO RELATED APPLICATION

This application claims benefit under 35 U.S.C. § 119(e) of U.S. Provisional Application having Ser. No. 62/190,148 filed Jul. 8, 2015, which is hereby incorporated by reference herein in its entirety.

FIELD

The subject disclosure relates to robotics and more particularly to a biomimetics based robot and simulation.

BACKGROUND

Robotic systems to date have produced primarily machines that bear little resemblance to human beings. Part of the reason for non-humanoid approaches to robot builds is the difficulty in replicating human balance and coordination in machine language that is translated into mechanical movement. For example, with few exceptions, robots typically employ quadruped or track systems to move. It has been a difficult challenge to construct quadruped systems that can maintain balance while walking. The internal elements, (for example, support bars, hydraulic systems, pneumatic systems, etc.) have been difficult to coordinate between the upper robot halves and the legs. Coordination is often a product of insufficient programming that is not seen until live testing.

Currently, simulation software predicts a desired movement rather than actual performance between robot elements. This can be an expensive approach since once the build is started, troubleshooting may result in costly redesigns of robot features.

The result has been robots that appear more mechanical than humanoid. While some recent attempts have produced humanoid looking features on robots, the challenges with movement and coordination persist.

In addition, there have been many challenges to constructing robots with artificial muscles that can replicate humanoid movement. Currently robots can produce either fast twitch or slow twitch movements but not both in coordination. One of the challenges lies in the design of artificial muscles. For example, some robots use pure hydraulic cable systems which provide linear movement unlike human movement. Examples can be seen on factory floor assembly lines. Other robots use artificial muscles based on electroactive polymer casings that are actuated by applying an electric field to the casing. While such an approach may work for an individual artificial muscle, a negative phenomenon is observed when such artificial muscles are positioned in abutment as real muscles would be in a muscular system. The electric field applied to electro-active casings creates a spillover effect onto adjacent artificial muscles. As a result, electromagnetic interference may be observed causing the artificial muscles to operate out of sync with adjacent muscles and or fail altogether because the electric field signal applied is negated. Moreover, artificial muscles relying purely on electro-active polymer casings suffer from fatigue and being overloaded easily by heavy loads because the polymers have relatively low tensile strength.

As can be seen, there is a need for a robot that moves and appears humanoid and for a process to predict the performance of robots accurately.

SUMMARY

In one aspect of the disclosure, a biomimetics based robot comprises an artificial skeletal structure. An artificial muscular system is attached to the artificial skeletal structure. The robot includes artificial muscles comprising, flexible casing, a fluid channel through the flexible casing configured to contract and relax the flexible casing via controlled fluid inflow/outflow from the flexible casing, and a filament coupled to opposing ends of the flexible casing. The robot may further comprise: a power source; a pump; an actuator; and a processing unit. The processing unit is connected to the power source, the pump and the actuator. The processing unit may be configured to: control the pump to pump fluid into and out of the flexible casing of respective muscles and control the actuator to oscillate a length of the filament, to expand and contract the flexible casing of respective muscles in coordinated fashion to mimic human movement.

In another aspect, a biomimetics based robot comprises an artificial skeletal structure. An artificial muscular system including arrays of artificial muscles is attached to the artificial skeletal structure. The artificial muscles comprise a non-electroactive polymer casing, a fluid channel through the non-electroactive polymer casing configured to contract and relax the non-electroactive polymer casing via controlled fluid inflow/outflow from the non-electroactive polymer casing, a solenoid valve on either an inflow side or outflow side of the fluid channel, and a filament coupled to opposing ends of the non-electroactive polymer casing. The robot also comprises: a power source; a pump; a fluid network configured to circulate fluid, via the pump, from the outflow side of the fluid channel to the inflow side of the fluid channel; a heating element connected to the filament; a controller connected to the solenoid valve and configured to open and close the solenoid valve; and a processing unit. The processing unit may be connected to the power source, the pump, the heating element, and the controller. The processing unit is configured to: control the pump to pump fluid into and out of the non-electroactive polymer casing of respective artificial muscles, control the heating element to lengthen and shorten the filament, and control the controller to open and close the solenoid valve, to expand and contract the non-electroactive polymer casing of respective muscles in coordinated fashion to mimic human movement.

In yet another aspect, an artificial muscle comprises flexible casing, a fluid channel through the flexible casing configured to contract and relax the flexible casing via controlled fluid inflow/outflow from the flexible casing, the fluid channel including a connection to a fluid pump for controlling the fluid inflow/outflow; and a filament coupled to opposing ends of the flexible casing and connected to an actuator controlling the length of the filament to contract and relax the flexible casing.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1A:
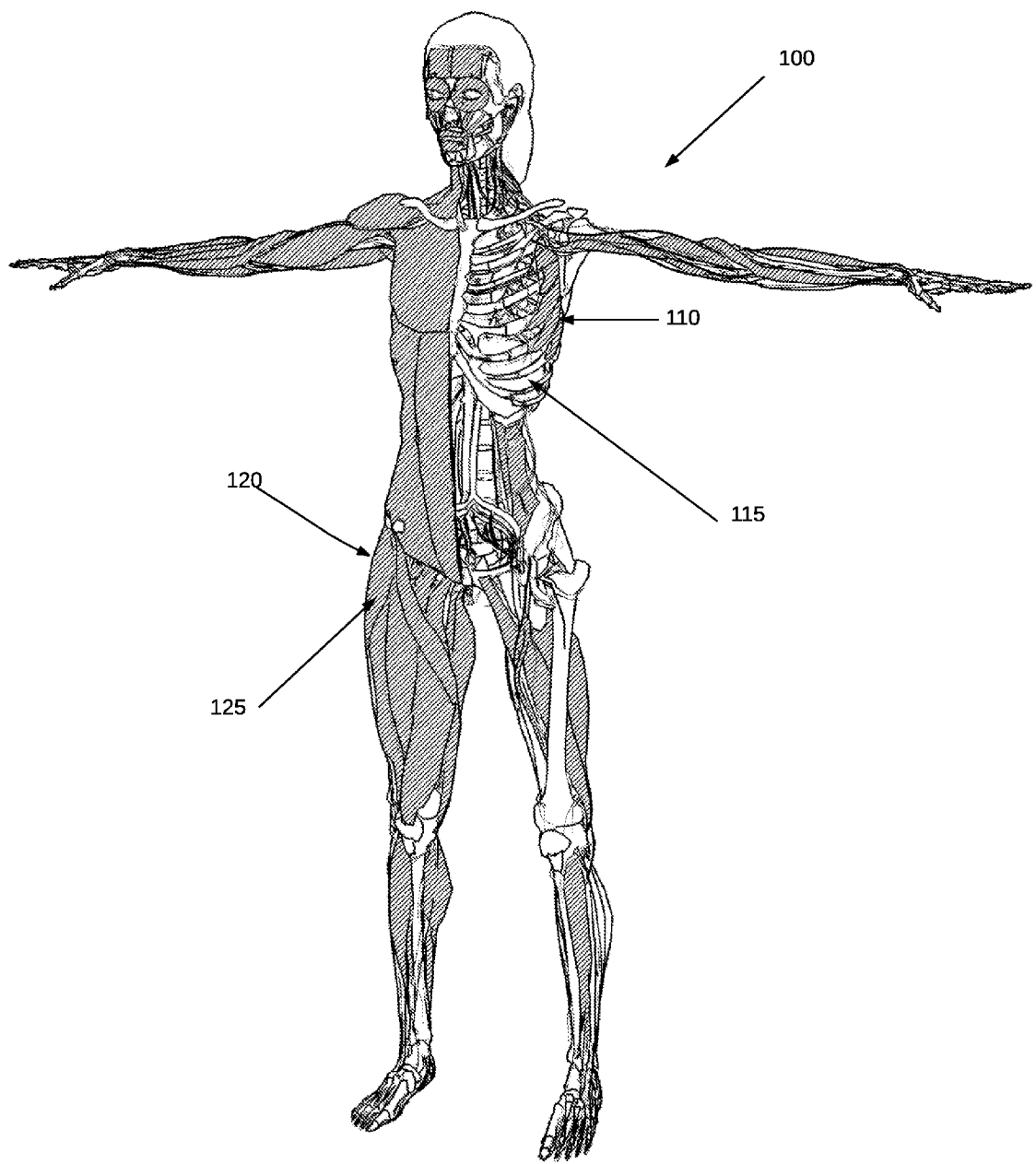
FIG. 1A is a front perspective view of a biomimetic robot with an artificial muscle system and exposed artificial skeletal system in accordance with an embodiment of the subject technology.
Figure 1B:
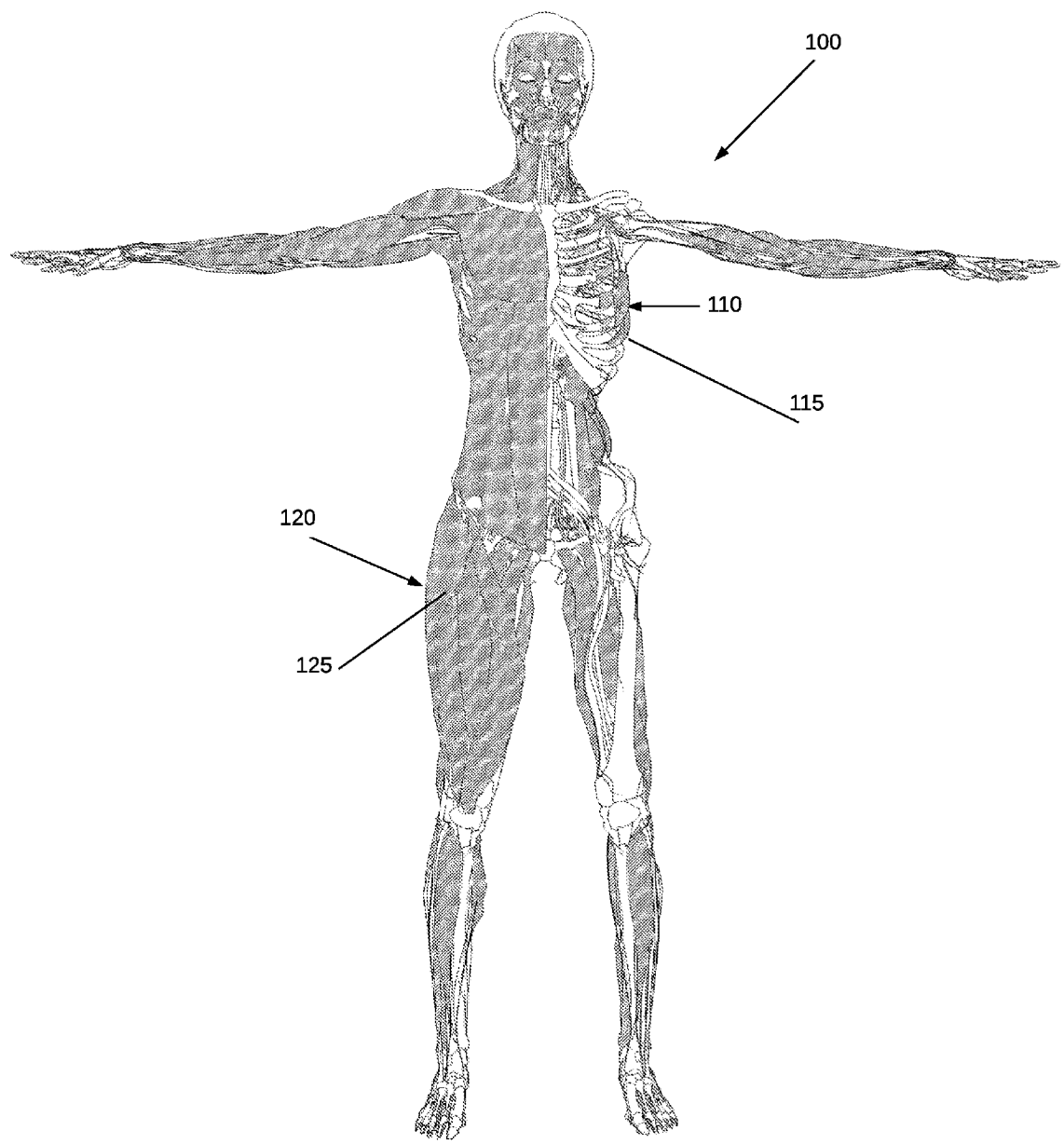
FIG. 1B is a front view of the biomimetic robot of FIG. 1A.
Figure 1C:
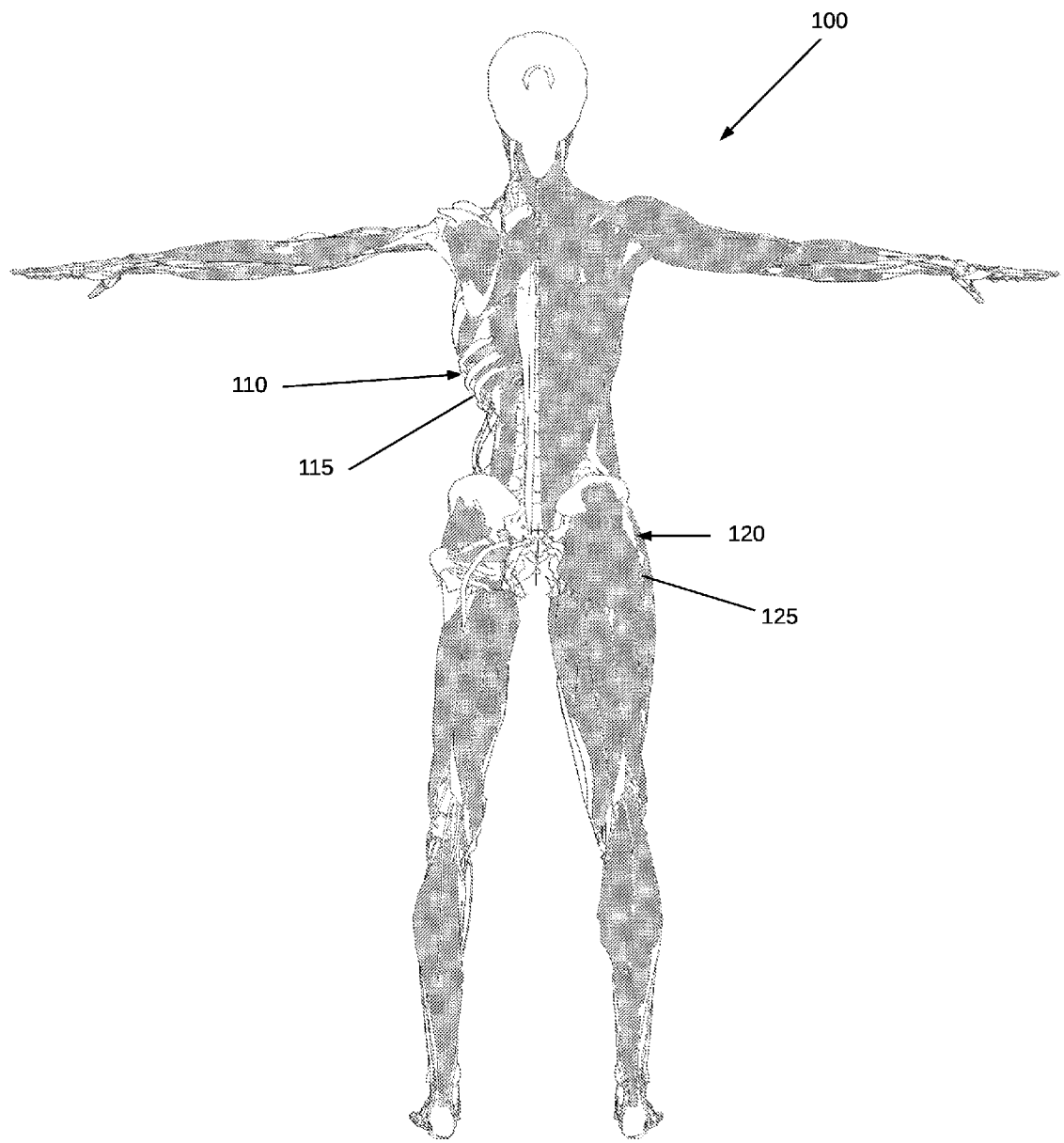
FIG. 1C is a rear view of the biomimetic robot of FIG. 1A.
Figure 1D:
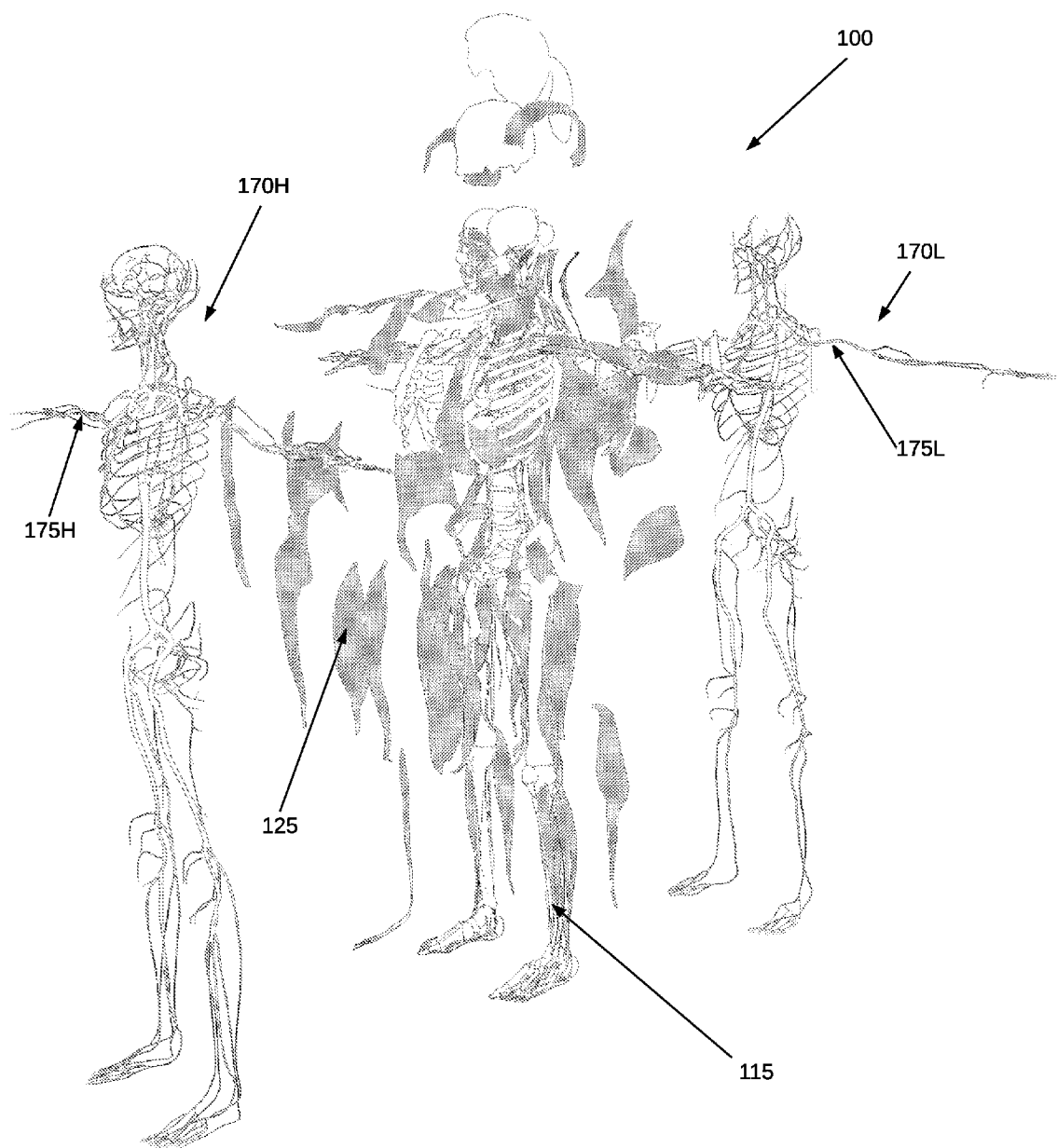
FIG. 1D is an exploded view of the biomimetic robot of FIG. 1A showing a circulatory system in addition to the muscle system and skeletal system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Generally, embodiments of the subject technology provide a biomimetics based robot and a process for simulating robot functionality. Robots of the subject technology appear humanoid, mimicking human anatomy and move with human-like coordination.

As will be appreciated, some aspects of the subject technology disclosed address problems related to controlling artificial muscles so that the muscles have both a fast twitch and slow twitch capacity so that they behave similar to human muscles. Having both fast twitch and slow twitch acting muscles allow robots to move both quickly or slowly depending on the application as well as provide improved load capacity. Moreover, as will be appreciated, some aspects overcome the deficiencies associated with electroactive polymer based artificial muscles that when positioned in a stack or array, are subject to EMI from each other when energized thus causing these kinds of artificial muscles to contract out of sync.

Other aspects of the subject technology address simulating the performance design of biomimetic robots so that the robot anatomy may be refined prior to actual build. As will be appreciated, aspects are capable of calculating the twitch speed of virtual artificial muscles, the force impact on various points of the virtual robot anatomy, predicted locations of extremities of a virtual robot and may then adjust output to the virtual artificial muscles and machine learn from iterated calculations what the real world expected performance of the robot will be.

Referring to FIGS. 1A-1D, a biomimetics based robot 100 is shown according to an exemplary embodiment of the subject technology. The robot 100 may include artificial humanoid structures (for example, a skeletal system 110 comprising artificial bones 115, a muscular system 120 comprising artificial muscles 125, a circulatory system 175 (shown as high pressure side $175_H$ and low pressure side $175_L$) and connective tissues (ligaments, tendons, etc.)) (not shown in FIGS. 1A-1D). The artificial bones 115 may be made from carbon fiber. Some embodiments may use 3D printing to produce the skeletal components. Elements of the skeletal system 110 may mimic many of the bones and their position in a human. The artificial muscle tissue may be made from a flexible material. In an exemplary embodiment, the artificial muscle tissue is a non-electroactive polymer, such as elastomer or thermoplastic urethane. Similar to a human, the muscle system 120 in the subject robot may support and control movement in the skeletal system 110. Connective tissues may be made from, for example, braided polyester. The connective tissues may connect for example, joints in the skeletal system 110. An artificial nervous system may be included in the form of wiring, sensors, and microcontrollers described more fully below.

Figure 2:
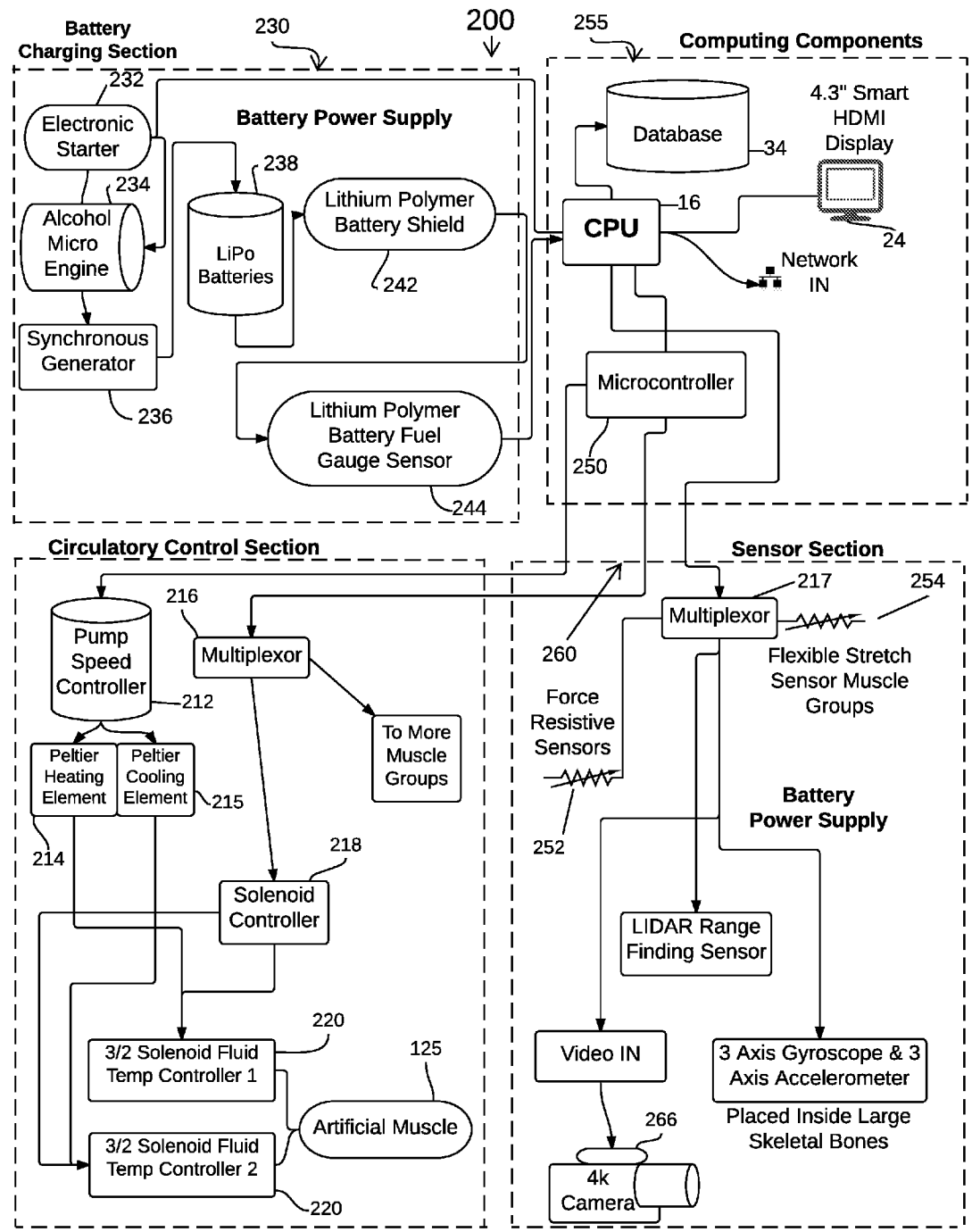
FIG. 2 is a block diagram of a biomimetic robot component schematic in accordance with an embodiment of the subject technology.

The following shows an example list of muscle groups that may comprise the muscular system 120 of a robot 100 of the subject technology. The following is an example list of artificial muscles' names named after real muscle groups:

Abductor Pollicis Brevis Muscle Left
Abductor Pollicis Brevis Muscle Right
Abductor Pollicis Longus Muscle Left
Abductor Pollicis Longus Muscle Right
Adductor Pollicis Muscle Left
Adductor Pollicis Muscle Right
Biceps Brachii Left
Biceps Brachii Muscle Left
Biceps Brachii Muscle Right
Biceps Brachii Right Brachioradialis Muscle Left
Brachioradialis Muscle Right
Coracobrachialis Muscle Left
Coracobrachialis Muscle Right
Deltoideus Muscle Left
Deltoideus Muscle Right
Dorsal Interossei Muscle Left 1
Dorsal Interossei Muscle Left 2
Dorsal Interossei Muscle Left 3
Dorsal Interossei Muscle Left 4
Dorsal Interossei Muscle Left S
Dorsal Interossei Muscle Left 6
Dorsal Interossei Muscle Left 7
Dorsal Interossei Muscle Right 1
Dorsal Interossei Muscle Right 2
Dorsal Interossei Muscle Right 3
Dorsal Interossei Muscle Right 4
Dorsal Interossei Muscle Right S
Dorsal Interossei Muscle Right 6
Dorsal Interossei Muscle Right 7
Extensor Carpi Radialis Brevis Muscle Left
Extensor Carpi Radialis Brevis Muscle Right
Extensor Carpi Radialis Longus Muscle Left
Extensor Carpi Radialis Longus Muscle Right
Extensor Carpi Ulnaris Muscle Left
Extensor Carpi Ulnaris Muscle Right
Extensor Digitorum Muscle Left
Extensor Digitorum Muscle Right
Extensor Indicis Muscle Left
Extensor Indicis Muscle Right
Extensor Pollicis Brevis Muscle Left
Extensor Pollicis Brevis Muscle Right
Extensor Pollicis Longus Muscle Left
Extensor Pollicis Longus Muscle Right
Flexor Carpi Radialis Muscle Left
Flexor Carpi Radialis Muscle Right
Flexor Carpi Ulnaris Muscle Left
Flexor Carpi Ulnaris Muscle Right
Flexor Digiti Quinti Brevis Muscle Left
Flexor Digiti Quinti Brevis Muscle Right
Flexor Digitorum Profundus Muscle Left
Flexor Digitorum Profundus Muscle Right
Flexor Digitorum Superficialis Muscle Left
Flexor Digitorum Superficialis Muscle Right
Flexor Pollicis Brevis Muscle Left
Flexor Pollicis Brevis Muscle Right
Flexor Pollicis Longus Muscle Left
Flexor Pollicis Longus Muscle Right
Lummbrical Muscle Left
Lummbrical Muscle Left 1
Lummbrical Muscle Left 2
Lummbrical Muscle Left 3
Lummbrical Muscle Left 4
Lummbrical Muscle Left 5
Lummbrical Muscle Right
Lummbrical Muscle Right 1
Lummbrical Muscle Right 2
Lummbrical Muscle Right 3
Lummbrical Muscle Right 4
Lummbrical Muscle Right 5
Opponens Digiti Quinti Muscle Left
Opponens Digiti Quinti Muscle Right
Opponens Pollicis Muscle Left
Opponens Pollicis Muscle Right
Palmar Interosse Muscle Left
Palmar Interossei Muscle Left 1
Palmar Interossei Muscle Left 2
Palmar Interossei Muscle Right
Palmar Interossei Muscle Right 1
Palmar Interossei Muscle Right 2
Palmaris Longus Muscle Left
Palmaris Longus Muscle Right
Pronator Quadratus Muscle Left
Pronator Quadratus Muscle Right
Pronator Teres Muscle Left
Pronator Teres Muscle Right
Tricep Muscle Left
Tricep Muscle Right
Tricep Muscle Left
Tricep Muscle Right
Digiti Quinit Brevis Muscle Left
Digiti Quinit Brevis Muscle Right
Digastric Muscle Left
Digastric Muscle Right
Levator Scapulae Muscle Left
Levator Scapulae Muscle Right
Platysma Muscle Left
Platysma Muscle Right
Scalene Muscle Left
Scalene Muscle Left 1
Scalene Muscle Left 2
Scalene Muscle Right
Scalene Muscle Right 1
Scalene Muscle Right 2
Scalenus Anterior Muscle Left
Scalenus Anterior Muscle Right
Semispinalis Capitis Muscle Left
Semispinalis Capitis Muscle Right
Semispinalis Capitis Muscle Left 1
Semispinalis Capitis Muscle Right 1
Semispinalis Capitis Muscle Left 2
Semispinalis Capitis Muscle Right 2
Semispinalis Capitis Muscle Left 3
Semispinalis Capitis Muscle Right 3
Semispinalis Capitis Muscle Left 4
Semispinalis Capitis Muscle Right 4
Semispinalis Capitis Muscle Left 5
Semispinalis Capitis Muscle Right 5
Semispinalis Capitis Muscle Left 6
Semispinalis Capitis Muscle Right 6
Semispinalis Cervisis Muscle Left
Semispinalis Cervisis Muscle Right
Semispinalis Cervisis Muscle Left 1
Semispinalis Cervisis Muscle Right 1
Semispinalis Cervisis Muscle Left 2
Semispinalis Cervisis Muscle Right 2
Semispinalis Cervisis Muscle Left 3
Semispinalis Cervisis Muscle Right 3
Semispinalis Cervisis Muscle Left 4
Semispinalis Cervisis Muscle Right 4
Semispinalis Cervisis Muscle Left 5
Semispinalis Cervisis Muscle Right 5
temode domasto d Muscle Left 6
Sternode domasto d Muscle Right 6
SternoCleidomastoid Muscle Left
Sternocleidomastoid Muscle Right
Sternohyoid Muscle Left
Sternohyoid Muscle Right
Sternothyroideus Muscle Left
Sternothyroideus Muscle Right
Stylohyoid Muscle Left
Stylohyoid Muscle Right
Thyrohyoid Muscle Left
Thyrohyoid Muscle Right LEG MUSCLES GROUP
Abductor Digiti Minimi Left
Abductor Digiti Minimi Right
Abductor Hallucis Muscle Left
Abductor Hallucis Muscle Right
Adductor Brevis Muscle Left
Adductor Brevis Muscle Right
Adductor Longus Muscle Left
Adductor Longus Muscle Right
Adductor Magnus Muscle Left
Adductor Magnus Muscle Right
Bicep Femoris Muscle Left
Bicep Femoris Muscle Left 1
Bicep Femoris Muscle Right
Bicep Femoris Muscle Right 1
Bicep Femoris Muscle Left 1
Bicep Femoris Muscle Right 1
Extensor Digitorum Longus Muscle Left
Extensor Digitorum Longus Muscle Right
Extensor Hallucis Brevis Muscle Left 1
Extensor Hallucis Brevis Muscle Right
Extensor Hallucis Brevis Muscle Right 1
Extensor Hallucis Brevis Muscle Left 2
Extensor Hallucis Brevis Muscle Right 2
Extensor Hallucis Brevis Muscle3 Left
Extensor Hallucis Brevis Muscle3 Right
Extensor Hallucis Brevis Muscle4 Left
Extensor Hallucis Brevis Muscle4 Right
Extensor Hallucis Longus Muscle Left
Extensor Hallucis Longus Muscle Right
Flexor Digitorum Brevis Muscle1 Left
Flexor Digitorum Brevis Muscle1 Right
Flexor Digitorum Brevis Muscle02 Left
Flexor Digitorum Brevis Muscle 02 Right
Flexor Digitorum Brevis Muscle03 Left
Flexor Digitorum Brevis Muscle04 Left
Flexor Digitorum Longus Muscle Left
Flexor Digitorum Longus Muscle Right
Flexor Hallucis Longus Muscle Left
Flexor Hallucis Longus Muscle Right
Gastrocnemius Muscle Left
Gastrocnemius Muscle Right
Gluteaus Maximus Muscle Left
Gracilis Muscle Left
Gracilis Muscle Right
Illiacus Muscle Left
Illiacus Muscle Right
Ligamentum Patella Left
Ligamentum Patella Right
Obturator Externus Muscle Left
Obturator Externus Muscle Right
Obturator Internus Muscle Left
Obturator Internus Muscle Right
Pectineus Muscle Left
Pectineus Muscle Right
Peroneus Brevis Muscle Left
Peroneus Brevis Muscle Right
Peroneus longus Muscle Left
Peroneus longus Muscle Right
Piriformis Muscle Left
Piriformis Muscle Right
Psoas Major Muscle Left
Psoas Major Muscle Right
Quadriceps Femoris Muscle Left
Quadriceps Femoris Muscle Right
Rectus Femoris Muscle Left
Rectus Femoris Muscle Right
Sacrotuberous Ligament Left
Sacrotuberous Ligament Right
Sartorius Muscle Left
Sartorius Muscle Right
Semimembranosus Muscle Left
Semimembranosus Muscle Right
Soleus Muscle Left
Soleus Muscle Right
Superior Gemellus Muscle Left
Superior Gemellus Muscle Right
Tensor Fasciae Latae Muscle Left
Tensor Fasciae Latae Muscle Right
Tibialis Anterior Muscle Left
Tibialis Anterior Muscle Right
Tibialis Poster or Muscle Left
Tibialis Poster or Muscle Right
Vastus Intermedius Muscle Left
Vastus Intermedius Muscle Right
Vastus Lateralis Muscle Left
Vastus Lateralis Muscle Right
Vastus Medialis Muscle Left
Vastus Medialis Muscle Right
TORSO MUSCLES GROUP
DIaphragm Muscle Geo
Ilcostal Muscle Left
Ilcostal Muscle Right
Infraspinatus Muscle Left
Infraspinatus Muscle Right
Infraspinatus Muscle Right
Intercostal Muscle Large Left
Intercostal Muscle Large Right
Intercostal Muscle Small Left
Intercostal Muscle Small Right
Internal Oblique Left
Internal Oblique Right
Latissim Muscle Left
Latissim Muscle Right
Levator Scapulae Muscle Left
Levator Scapulae Muscle Right
Levator Scapulae Muscle Left 2
Levator Scapulae Muscle Right 2
Levator Scapulae Muscle Left 4
Levator Scapulae Muscle Right 4
Longissimus Muscle Left
Longissimus Muscle Right
Omohyoideus Muscle Left
Omohyoideus Muscle Right
Pectoral Muscle Left
Pectoral Muscle Right
Pectoralis Minor Muscle Left
Pectoralis Minor Muscle Right
Psoas Minor Muscle Left
Psoas Minor Muscle Right
Quadratus Lumborum Muscle Left
Quadratus Lumborum Muscle Right
Quadratus Lumborum Muscle Left 2
Quadratus Lumborum Muscle Right 2
Rectus Abdominis Muscle
Rhomboid Major Muscle Left
Rhomboid Major Muscle Right
Rhomboid Minor Muscle Left
Rhomboid Minor Muscle Right
Scalenus Anterior Muscle Left 2
Scalenus Anterior Muscle Left 3
Scalenus Anterior Muscle Right
Scalenus Anterior Muscle Right
Scalenus Posterior Muscle Left Scalenus Posterior Muscle Right
Scalenus Posterior Muscle Left 2
Scalenus Posterior Muscle Right 2
Scalenus Posterior Muscle Left
Scalenus Posterior Muscle Right
Serratus Anterior Muscle Left
Serratus Anterior Muscle Right
Serratus Anterior Muscle Left 2
Serratus Anterior Muscle Right 2
Serratus Anterior Muscle Left 3
Serratus Anterior Muscle Right 3
Serratus Anterior Muscle Left 4
Serratus Anterior Muscle Right 4
Serratus Anterior Muscle Left 5
Serratus AnteriorMuscle Right 5
Serratus Anterior Muscle Left 6
Serratus Anterior Muscle Right 6
Serratus Anterior Muscle Left 7
Serratus Anterior Muscle Right 7
Serratus Anterior Muscle Left 8
Serratus Anterior Muscle Right 8
Serratus Anterior Muscle Left 9
Serratus Anterior Muscle Right 9
Spinalis Muscle Left
Spinalis Muscle Right
Splenius Capitus Muscle Left
Splenius Capitus Muscle Right
Splenius Cervicis Muscle Left
Splenius Cervicis Muscle Right
Subscapularis Muscle Left
Subscapularis Muscle Right
Supraspinatus Muscle Left
Supraspinatus Muscle Right
Teres Major Muscle Left
Teres Major Muscle Right
Teres Minor Muscle Left
Teres Minor Muscle Right
Transversus Abdominis Muscle
Trapezius Muscle Left
Trapezius Muscle Right Referring now to FIG. 2, a block diagram of a biomimetic robot component circuit 200 is shown according to an exemplary embodiment. The circuit 200 generally includes a circulatory module 210, a power supply module 230, a computing module 255 and a sensor section module 260 connected to each other through wiring or conduits as represented by the arrows leading from one element to another.

The power supply module 230 is wired to and powers each element requiring a power source. The power supply module 230 may include a battery pack 238, for example, a lithium polymer battery, a fuel gauge sensor circuit 244, and a battery shield 242. Some embodiments may include an electronic starter 232, an engine 234, (for example, an alcohol micro engine), and an alternator or a synchronous generator 236 coupled to the battery pack 238. The battery pack 238 may be charged with the micro engine 234 (using for example, gasoline, diesel, alcohol or other fuel), with the alternator 236 (or synchronous generator). Control of the starter 232 and engine 234 may be coordinated with a CPU 16.

The computing module 255 may include a CPU 16 (sometimes referred to as a processing unit) in connection with each microcontroller 250 which may coordinate simultaneous control of multiple artificial muscles 125 (or muscle groups) and the feedback from multiple sensors from the sensor module 260. Data coordinated by the CPU 16 may be stored and retrieved from a system memory storage 34. Some embodiments may include a display 24 integrated into the robot 100 while some embodiments may include a port to connect an external display 24 to interact with the CPU 16. Some embodiments may also include a port for accessing a telecommunications network and to interface with a general computing device (described more fully below in FIG. 7) for software/firmware updates, to read data, and control functionality of the robot.

The circulatory module 210 includes a plurality of artificial muscles 125, which may be controlled for contraction by the other elements in the module 210. In an exemplary embodiment, the artificial muscle 125 may be contracted and relaxed by sending heated/cooled fluid (such as a gas, liquid, or oil) into the artificial muscle 125 and/or by heating a filament (described below). A pump controller 212 may send fluid through either a Peltier heating element 214 or a Peltier cooling element 215. Fluid from the heating/cooling elements 214/215 may be circulated to a temperature controller 220, for example a 3/2 solenoid fluid temperature controller to mix fluid to provide the temperature needed to contract or relax the artificial muscle 125 to a desired load capacity. A valve controller 218, may control opening or closing of a valve 135 (FIG. 3A) such as a solenoid to control retention or release of fluid from the artificial muscle 125. The temperature controller 220 may generate two temperatures to be pumped during repetitive motion such as walking. A cold fluid is pushed into relaxing artificial muscles 125 (see for example FIG. 3B) and a hot fluid pushed into contracting artificial muscles 125 (see for example, FIG. 3A) and vice versa depending on the cycle. A 50/50 mix of hot and cold fluid may be pumped into the artificial muscles 125 for medium contraction. The mix may then be divisible in quarters for 75%/25% contraction, etc. depending on the calculated load needed for movement. For sake of illustration only a single artificial muscle 125 is shown however, some embodiments may employ a multiplexor 216 to coordinate signals from a microcontroller 250 in the computing module 255 to the various artificial muscles 125 (or muscle groups). Some embodiments may include a microcontroller 250 dedicated to each muscle group.

The sensor module 260 may include a network of various sensors distributed throughout the robot 100 and wiring connected back to the CPU 16. A multiplexor 217 may coordinate feedback signals received from the various sensors and return signals provided by the CPU 16. Sensors may include force sensors 252 (for example force resistive sensors/resistors, stretch sensors 254 (for example strain gauges or resistors), a range finding sensor, a gyroscope and/or accelerometer, and a camera 266. The range finding sensor may be for example, LIDAR based. The range finding sensor may detect obstacles in the robot's path using range/distance/motion sensory. The combination of the LIDAR range finding and video source/camera 266 may be used for perception to setup up pathfinding input. In some embodiments, the robot 100 may speak with a chatterbox upon detected motion. In addition, detected objects may trigger the robot 100 to move its neck/head/eyes to follow objects using tracking. As will be understood, more than one sensor of each kind may be present in the robot 100 but for sake of illustration, only a single occurrence is shown.

Figure 2A:
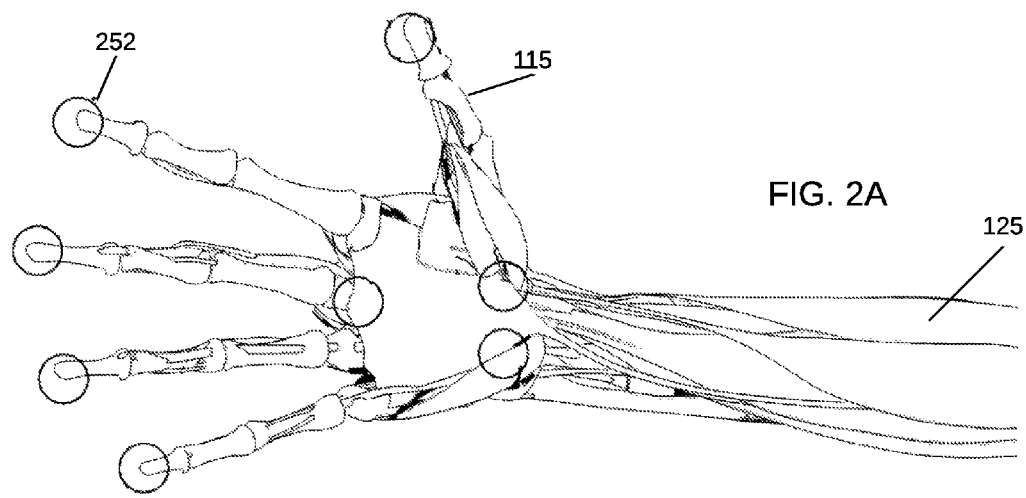
FIG. 2A is a partial view of a hand of the biomimetic robot of FIG. 1A depicting examples of force sensitive resistor locations in accordance with an embodiment of the subject technology.
Figure 2B:
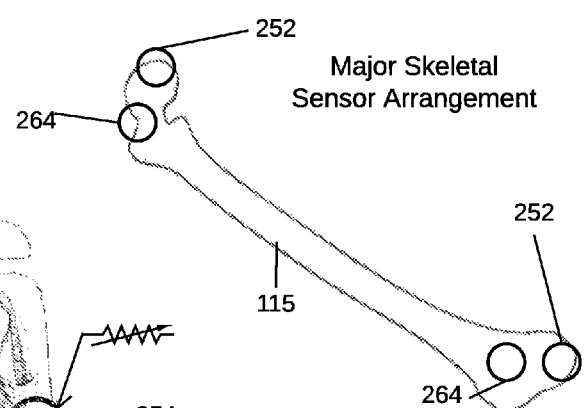
FIG. 2B is an isolated view of a bone of the biomimetic robot of FIG. 1A depicting examples of force sensitive resistor and gyroscopic/accelerometer locations in accordance with an embodiment of the subject technology.
Figure 2C:
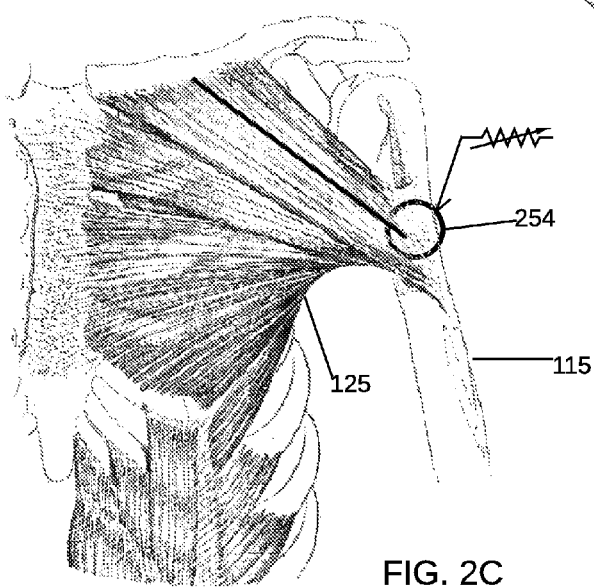
FIG. 2C is a partial view of a muscle array attached to an arm bone of the biomimetic robot of FIG. 1A depicting examples of flexible stretch sensor locations in accordance with an embodiment of the subject technology.

FIGS. 2A-2C show examples of sensor positioning on skeletal points and proximate connection points between muscle tissue and skeletal structures. Sensors may detect for example, force applied to a skeletal point, acceleration (for example when a body part is moving), and stress force on the connection between muscle/connective tissue and an associated bone or joint. A number of examples of locations for sensors are shown however, for sake of illustration, many more locations have been omitted and it will be understood that more sensor locations will be present on the robot 100.

Thus, the contraction/relaxation of artificial muscles 125 may be coordinated to cause for example, one leg to lift from the ground and simultaneously move forward (step) while the other leg supports the remainder of the skeletal structure on the ground. Sensors in the stepping leg may sense for example acceleration forward (or backward), the rate of fall toward the ground, the amount of strain placed on artificial muscles 125, a strain on attachment points to artificial bones 115 (or joints), and changes in forces of impact indicating contact with the ground. The feedback from these sensors may be provided to the microcontroller 250 and CPU 16 to control additional movements to the stepping leg and the remainder of muscle groups in the robot 100. For example, feedback from the gyroscope/accelerometer which may be placed proximate skeletal extremities may indicate to the CPU 16 whether movement is occurring at a rate that needs adjustment (for example, a foot is stepping down to quickly or too hard). As may be appreciated, the stepping movement is only one example of movement possible by the subject technology and many other coordinated movements are now thus possible.

Figures 3A, 3B, 3C:
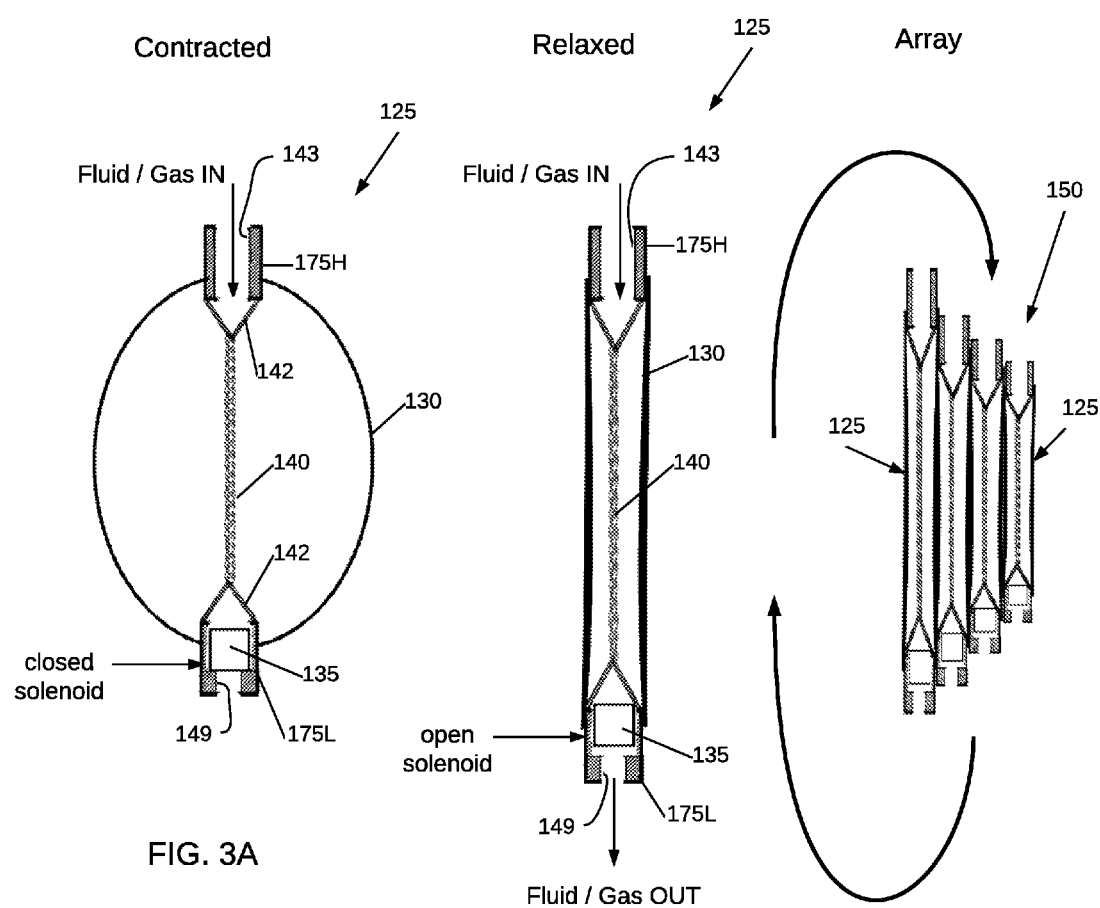
FIG. 3A is a cross-sectional front view of an artificial muscle system in a contracted state in accordance with an embodiment of the subject technology.
FIG. 3B is a cross-sectional front view of an artificial muscle system in a relaxed state in accordance with an embodiment of the subject technology.
FIG. 3C is a cross-sectional front view of an array of artificial muscle systems in a relaxed state and showing a path of circulation in accordance with an embodiment of the subject technology.

Referring now to FIGS. 3A-3B, an artificial muscle 125 is shown according to an exemplary embodiment. FIG. 3A shows the artificial muscle 125 in a contracted state (flexed). FIG. 3B shows the artificial muscle 125 in a relaxed state (unflexed). The artificial muscle 125 may include a flexible casing 130, which may be for example, an elastomer. In an exemplary embodiment, the flexible casing 130 is a non-electroactive polymer. A high pressure side $175_H$ conduit 143 may define an inflow side of a fluid channel that extends throughout the length of the flexible casing 130 to a low pressure side $175_L$ conduit 149. Some embodiments may include a valve 135 (for example a solenoid valve) positioned proximate at least one of the conduits 143 or 149 to regulate pressure pumped into the flexible casing 130 (as described above with respect to FIG. 2). In an exemplary embodiment, a filament 140 may be coupled to opposing ends of the flexible casing 130. The filament 140 may for example be connected to respective conduits 143 and 149 by anchors 142. The filament 140 may be for example a nylon filament. The filament 140 may be twisted, wound, braided, or meshed.

As will be appreciated, the actuation of the flexible casing 130 increases the speed or fast twitch of the artificial muscle 125 while the filament 140 provides load strength. In operation, the flexible casing 130 may be filled with hot, cold, or mixed temperature fluid to contract or relax the artificial muscle 125. As the PSI increases the casing 130 contracts for the quick twitch. The stronger filament 140 may take over the bulk of the load when the output needed may overload the strength of the flexible casing 130. The valve 135 may be closed when for example hot fluid is pumped in to the fluid channel to expand the walls of the casing 130. The filament 140 also heats up with the heated fluid and shortens in length pulling the opposing walls of the flexible casing 130 it is connected to closer together. The valve 135 may be opened to release heated fluid and cooled (or cooler) fluid may be pumped into the flexible casing 130 to relax the walls of the artificial muscle 125 to return to a default or unexpanded state. The filament 140 also stretches back to its default length as it is exposed to cooling fluid and the opposing walls of the flexible casing 130 it is connected to are drawn back outward away from each other or straightened out. During a cycle, the filament 140 oscillates in length proportional to the temperature of the fluid and proportional to the PSI acting on the walls of the casing 130. As will be appreciated, the use of the flexible casing 130 and heated fluid helps provide "quick twitch" action because the flexible casing 130 can expand and relax responsively to changes in pressure. The filament 140 provides support to the flexible casing 130 because the filament 140 has higher tensile strength and exceeds current load capacity of organic real muscles and contracts more with more force. Thus, when a "slow twitch" action is needed, the filament 140 may provide the bulk of the force to the application when fast twitching is not necessarily the priority. Thus, the flexible casing 130 is spared from fatigue and damage from routine fast or slow twitch based movement.

Figure 4:
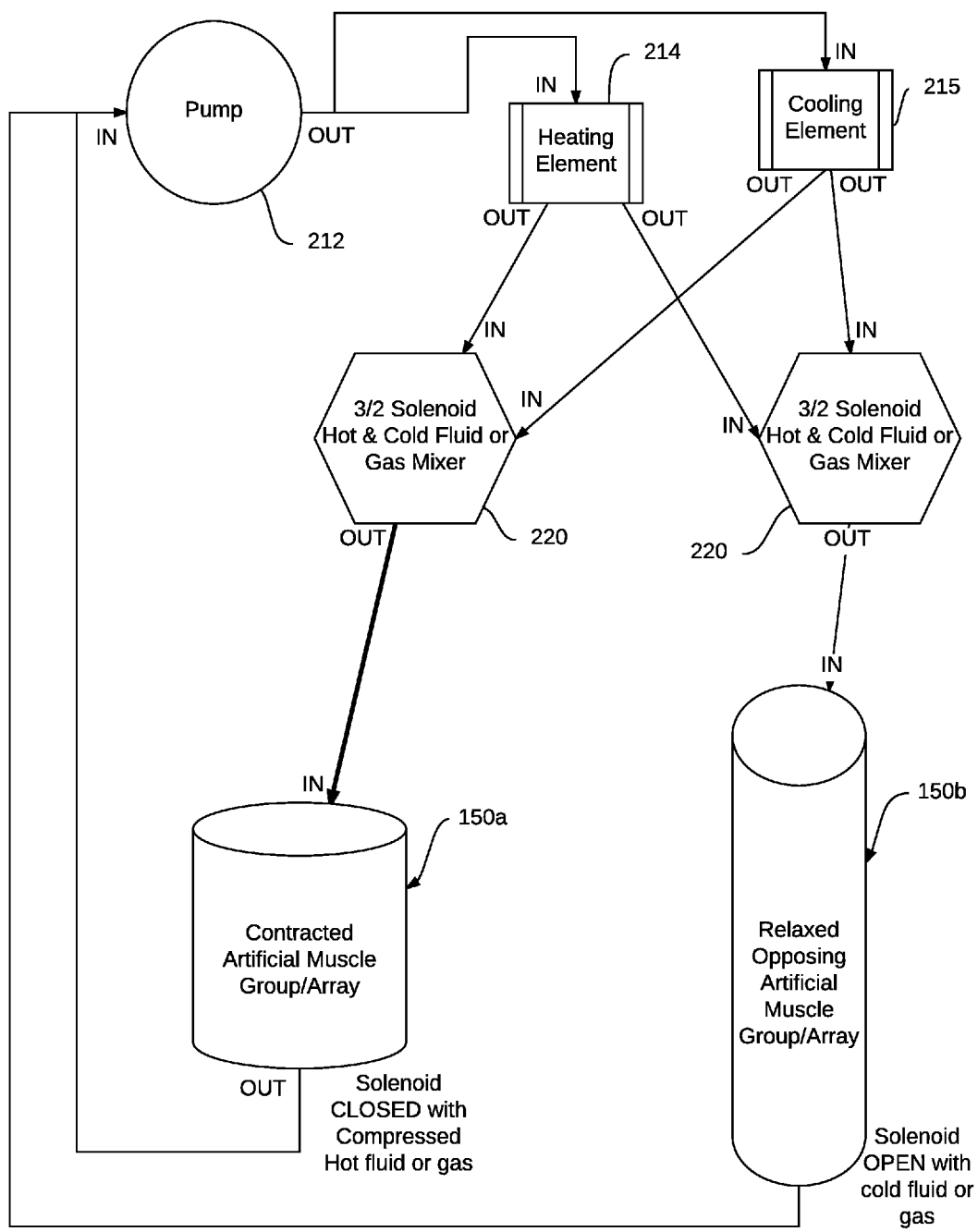
FIG. 4 is a flowchart of an artificial muscle and circulatory system in accordance with an aspect of the subject technology.

Referring now to FIG. 3C and FIG. 4, an array 150 of artificial muscles 125 along with a circulation circuit are shown according to exemplary embodiments. An example of a circulation pattern of fluid is shown in FIG. 3C which represents the high to low side movement of fluid through the artificial muscles 125. As described earlier, the pump 212 pumps fluid through heating element 214 or cooling element 215 and solenoid temperature control mixers 220 depending on whether an array 150 should be contracted or relaxed. As will be appreciated, skeletal portions of the robot 100 have opposing muscle arrays 150 to provide counter forces during movement, which help provide the biomimetic result. For example, an artificial leg may have artificial quadriceps and an opposing array 150 of artificial hamstrings. Aspects of the subject technology pump heated fluid into an array 150a to contract the artificial muscles and synchronously, pump cooled fluid into an opposing muscle array 150b. While the array 150 is shown with artificial muscles 125 stacked in parallel, it will be understood that this is for sake of illustration and that the artificial muscles 125 may overlap similar to the arrangement of muscles in a human body (for example as shown in FIGS. 1A-1D).

In addition, it will be further appreciated that embodiments using non-electroactive polymers overcome the deficiencies of some prior art artificial muscles that use electroactive polymers for artificial muscle arrays. Non-electroactive polymers preclude the phenomena of electromagnetic interference that spills over from electroactive based artificial muscles into adjacent electro-active based artificial muscles. The artificial muscles 125 of the present disclosure mechanically support adjacent artificial muscles 125 without electromagnetic disruption. Thus, coordinated actuation of the artificial muscles 125 in arrays 150 is achieved with expected processor based synchronization.

Figure 5A:
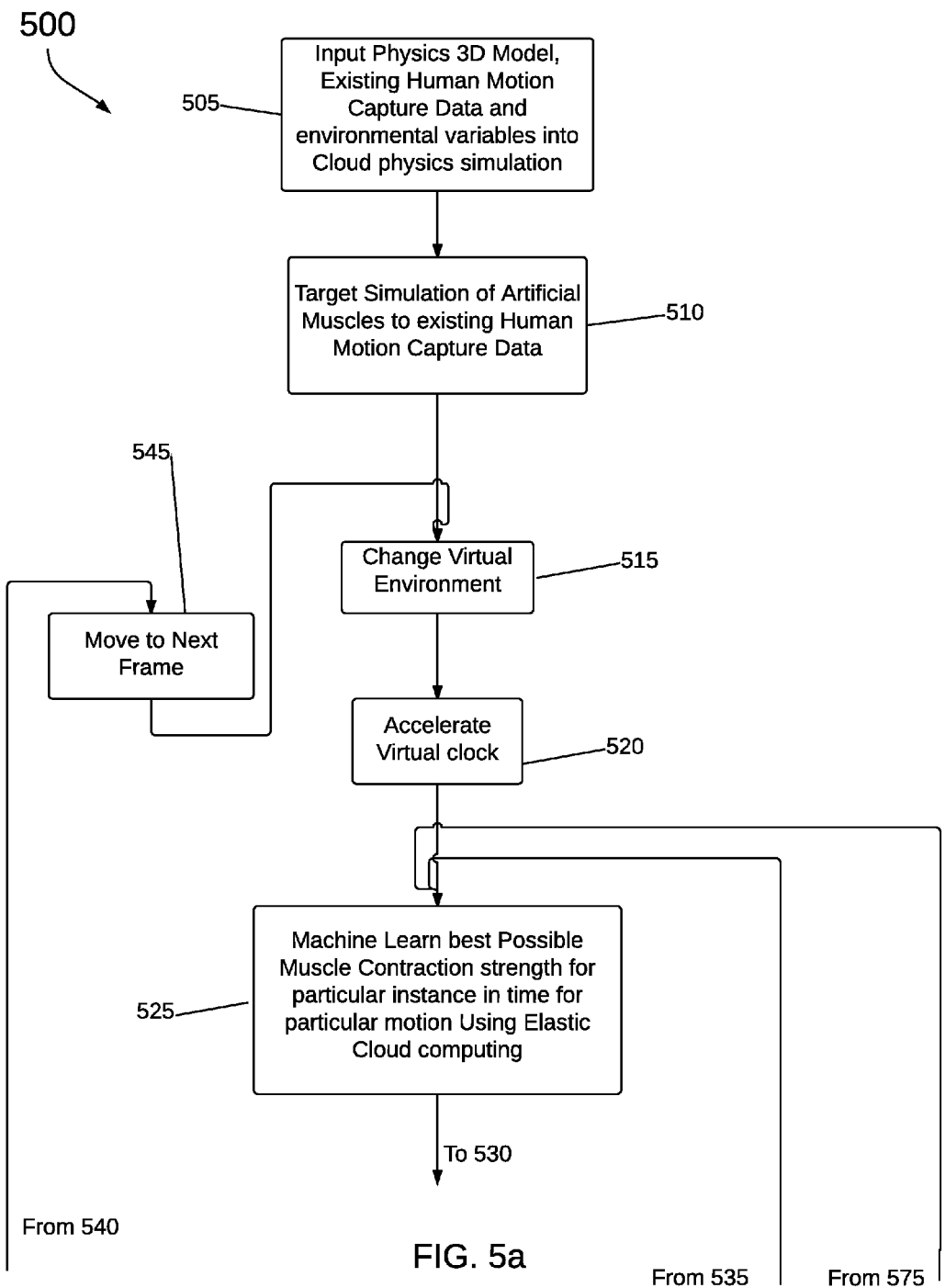
FIGS. 5a and 5b are a flowchart of a robotic physics simulation engine in accordance with an embodiment of the subject technology.
Figure 5B:
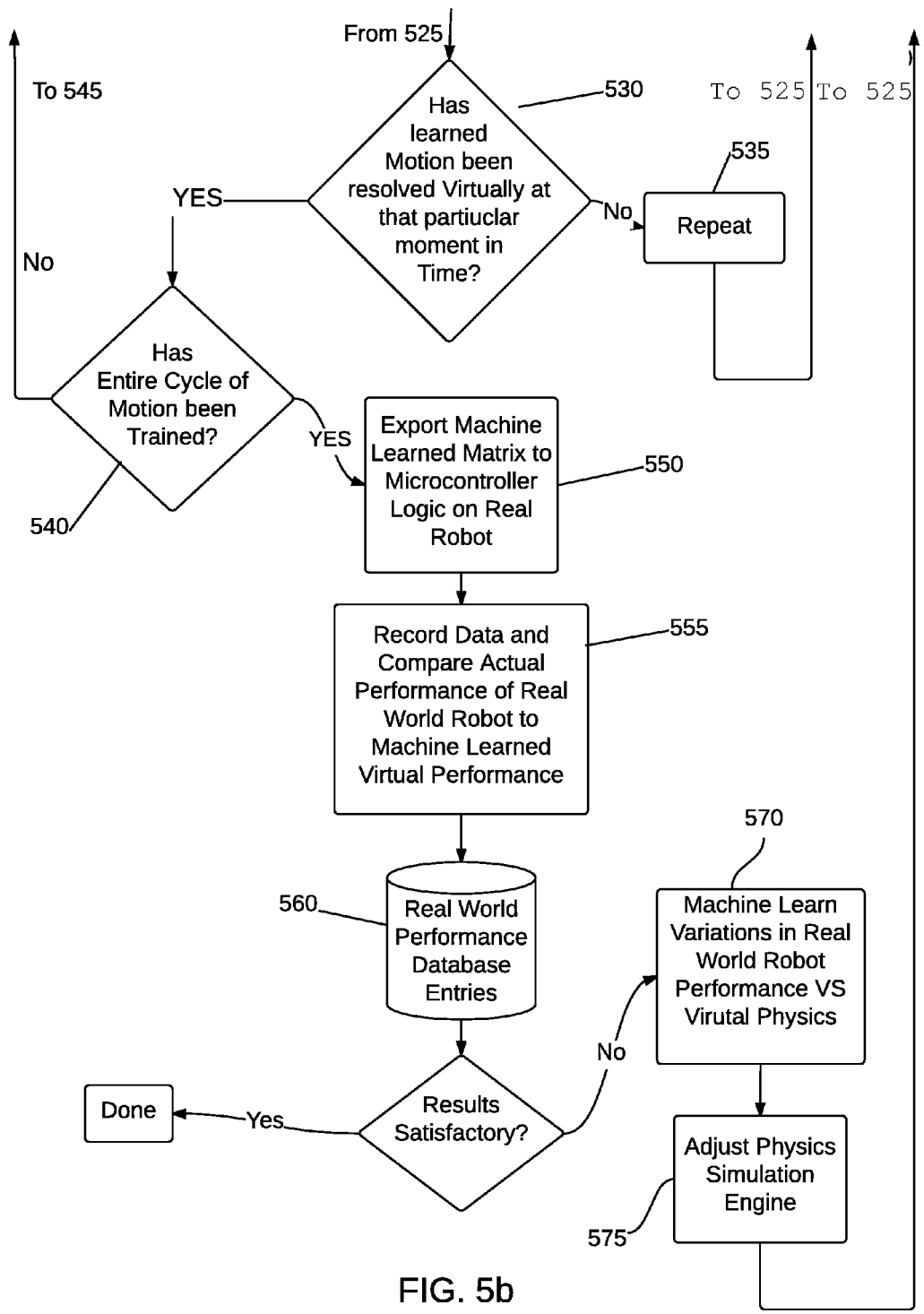

Referring now to FIGS. 5a and 5b, a method 500 of simulating robotic physics is shown according to an exemplary embodiment of the subject technology. The method 500 is shown in block form describing the general steps/actions for simulating performance of a robot design and construct in a virtual world prior to build and/or introduction of a new movement into the robot's stored memory. In general, the method 500 uses stored motion capture video of for example human motion to simulate movement frame by frame for a robot design. A physics 3D model, motion capture data, and environmental variables may be input 505 into the simulation engine. The simulated movement of artificial muscles may be targeted 510 to replicate the motion retrieved from motion capture data (of for example human movement). Simulated movement may be based on the amount of pressure/temperature applied to artificial muscles and the cycle rate actuation. Movement may be evaluated frame by frame to replicate the targeted data. The targeted movement performance may be evaluated by changing 515 the virtual environment. A virtual clock may be accelerated 520 to speed up the frame by frame evaluation. The engine may machine learn 525 the best possible muscle contraction strength for a particular instance in time and for a particular motion. The engine may determine 530 whether the machine learned motion from block 525 has been resolved virtually for the particular moment in time. If there is no resolution at block 525, then the engine may repeat 535 the machine learning step of block 525. If resolution is determined, the engine may determine 540 whether an entire cycle of motion has been trained for use in the robot. If not, the process returns to block 545 to move to the next frame for analysis. If the entire cycle is trained, the learned motion may be exported 540 for storage in the real robot's system memory storage or embedded in the real robot's CPU and/or microcontroller(s). The learned motion data may be recorded 555 and compared to a performance of the real robot using the stored motion data. The recorded data and comparison data may be stored 560 in a simulation system database. Based on predetermined criteria, the engine may determine whether the performance results by the real robot are satisfactory. If satisfactory, the method 500 concludes. If unsatisfactory, the engine may machine learn 570 variations in real world robot performance as compared to virtual physics. Based on the machine learned results of block 570, the engine may adjust 575 the physics simulation engine and return the process to block 525.

Figure 6:
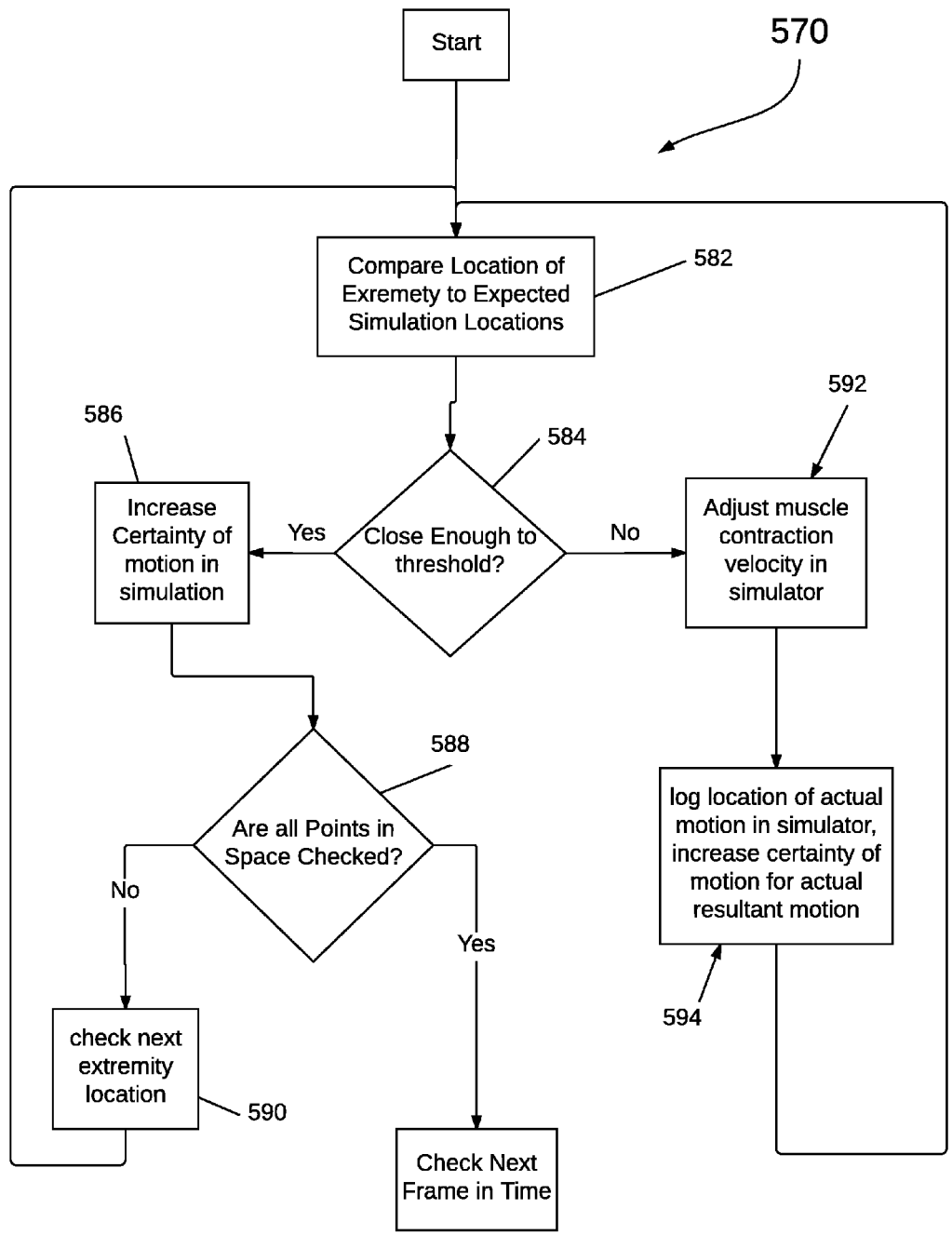
FIG. 6 is a flowchart of a machine learning sub-process of real world robot performance compared to virtual physics simulations in accordance with an embodiment of the subject technology.

Referring now to FIG. 6, the sub-process 570 of machine learning variations in real world robot performance versus virtual physics is shown in more detail according to an exemplary embodiment. The sub-process includes comparing 582 the real world location of an extremity on the real robot to an expected location via simulation. The location of the extremity may be gathered by sensor data for example as described with respect to FIGS. 2 and 2A-2C. A determination 584 is performed on whether the real world location of an extremity on the real robot to an expected location is within a threshold value.

If the determination is within the threshold value, the engine increases 586 the value of certainty of motion in the simulation. A subsequent determination 588 is performed on whether all points in motion space for the real robot are checked within the frame being analyzed. If not the next extremity location may be checked 590 and the sub-process may return to block 582. If all points have been checked, then the analysis may move to the next frame (for example, block 545 in method 500).

If the determination in block 584 is not within the threshold value, then muscle contraction velocity may be adjusted 592 within the simulation engine. The actual motion of the real robot extremity may be logged 594 and the certainty of motion for actual resultant motion may be increased. The sub-process may then reiterate the comparison performed in block 582 with the adjusted data.

Figure 7:
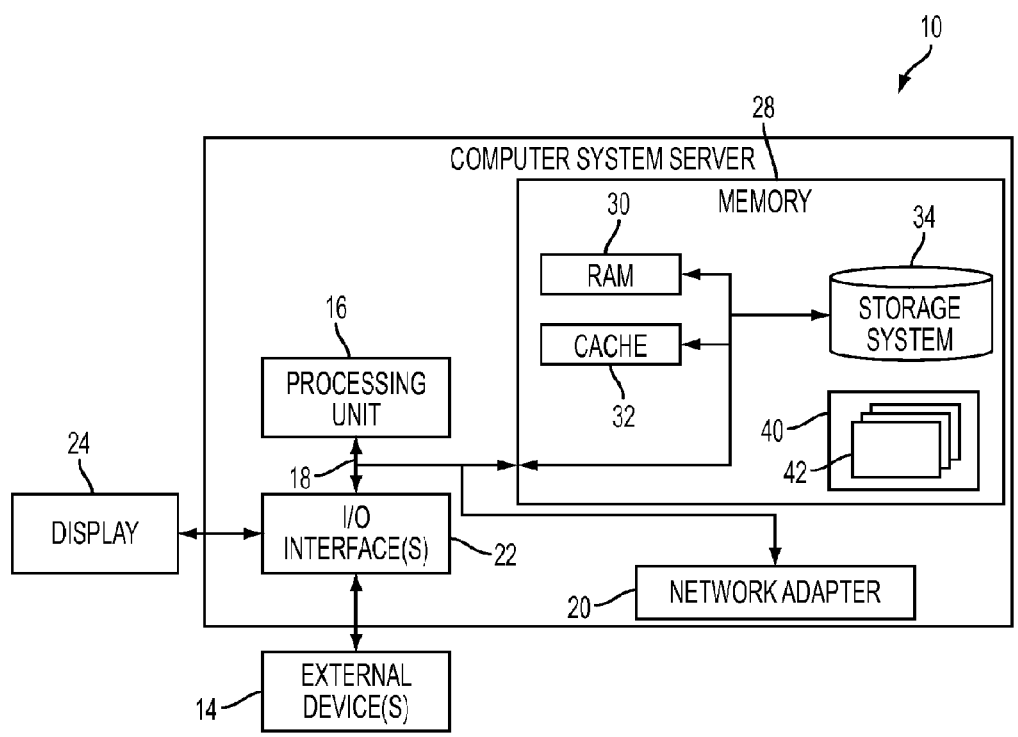
FIG. 7 is a block diagram of a general computing device in accordance with an aspect of the subject technology.

Referring now to FIG. 7, a schematic of an example of a computer system/server 10 is shown. The computer system/server 10 is shown in the form of a general-purpose computing device. The computer system/server 10 may serve the role as the machine implementing for example the functions in a virtual setting of running physics based simulation, storing motion capture video, comparing simulation results to captured motion video, adjusting muscle control to mimic/match motion capture video, and storing muscle control data for simulated muscles. The computer system/server 10 may in some embodiments serve the role as the machine implementing for example the functions in the real robot of providing instructions for muscle control, calculating sensor feedback and adjusting to muscle control. The components of the computer system/server 10 may include, but are not limited to, one or more processors or processing units 16 (for example, the CPU and microcontrollers of FIG. 2), a system memory 28, and a bus 18 that couples various system components including the system memory 28 to the processor 16.

The computer system/server 10 may perform functions as different machine types depending on the role in the system the function is related to. For example, depending on the function being implemented at any given time when interfacing with the system, the computer system/server 10 may be for example, personal computer systems, tablet devices, mobile telephone devices, server computer systems, hand-held or laptop devices, multiprocessor systems, microprocessor-based systems, set top boxes, programmable consumer electronics, network PCs, and distributed cloud computing environments that include any of the above systems or devices, and the like. The computer system/server 10 may be described in the general context of computer system executable instructions, such as program modules, being executed by a computer system (described for example, below). In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments as described above.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. For example, while the foregoing was described in the context of a humanoid or bi-pedal robot, aspects of the foregoing description may be applied to quadrupeds or any other pedal structure to design, simulate, produce and, control a functioning robot.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:
1. A biomimetics based robot, comprising:
   an artificial skeletal structure;
   an artificial muscular system attached to the artificial skeletal structure, artificial muscles of the artificial muscular system including,
      flexible casing, a fluid channel through the flexible casing configured to contract and relax the flexible casing via controlled fluid inflow/outflow from the flexible casing, and a filament coupled to opposing ends of the flexible casing;

a power source;

a pump;

an actuator; and a processing unit connected to the power source, the pump and the actuator, the processing unit configured to:

control the pump to pump fluid into and out of the flexible casing of respective muscles and control the actuator to oscillate a length of the filament, to expand and contract the flexible casing of respective muscles in coordinated fashion to mimic human movement.

2. The biomimetics based robot of claim 1, wherein the flexible casing is an elastomer.

3. The biomimetics based robot of claim 1, wherein the flexible casing comprises a non-electroactive polymer.

4. The biomimetics based robot of claim 1, wherein the actuator includes a heating/cooling element coupled to the filament and configured to actuate the filament by controlling heat applied to the filament.

5. The biomimetics based robot of claim 1, further comprising a valve positioned on either an inflow side or outflow side of the fluid channel, the valve controlled by the processing unit or a dedicated microcontroller.

6. The biomimetics based robot of claim 5, further comprising a heating/cooling element coupled to the fluid channel and configured to:

provide heated fluid to the flexible casing, contracting the flexible casing; and provide cooled fluid to the flexible casing, relaxing the flexible casing.

7. The biomimetics based robot of claim 1, further comprising a force resistive sensor positioned at extremities or joints of the artificial skeletal structure.

8. The biomimetics based robot of claim 1, further comprising a stretch sensor positioned at an attachment point of at least one of the artificial muscles to an artificial bone of the artificial skeletal structure.

9. A biomimetics based robot, comprising:

an artificial skeletal structure;

an artificial muscular system attached to the artificial skeletal structure, arrays of artificial muscles of the artificial muscular system, wherein the artificial muscles include, a non-electroactive polymer casing, a fluid channel through the non-electroactive polymer casing configured to contract and relax the non-electroactive polymer casing via controlled fluid inflow/outflow from the non-electroactive polymer casing, a solenoid valve on either an inflow side or outflow side of the fluid channel, and a filament coupled to opposing ends of the non-electroactive polymer casing;

a power source;

a pump;

a fluid network configured to circulate fluid, via the pump, from the outflow side of the fluid channel to the inflow side of the fluid channel;

a heating element connected to the filament;

a controller connected to the solenoid valve and configured to open and close the solenoid valve; and a processing unit connected to the power source, the pump, the heating element, and the controller, the processing unit configured to:

control the pump to pump fluid into and out of the non-electroactive polymer casing of respective artificial muscles, control the heating element to lengthen and shorten the filament, and control the controller to open and close the solenoid valve, to expand and contract the non-electroactive polymer casing of respective muscles in coordinated fashion to mimic human movement.

10. The biomimetics based robot of claim 9, further comprising a force resistive sensor positioned at extremities or joints of the artificial skeletal structure.

11. The biomimetics based robot of claim 9, further comprising a stretch sensor positioned at an attachment point of at least one of the artificial muscles to an artificial bone of the artificial skeletal structure.

12. The biomimetics based robot of claim 9, wherein the fluid network includes a high pressure flow on the inflow side and a low pressure flow on the outflow side of the fluid channel.

13. An artificial muscle, comprising:

flexible casing, a fluid channel through the flexible casing configured to contract and relax the flexible casing via controlled fluid inflow/outflow from the flexible casing, the fluid channel including a connection to a fluid pump for controlling the fluid inflow/outflow; and a filament coupled to opposing ends of the flexible casing and connected to an actuator controlling the length of the filament to contract and relax the flexible casing.

14. The artificial muscle of claim 13, wherein the flexible casing comprises a non-electroactive polymer.

15. The artificial muscle of claim 13, wherein the filament comprises nylon.

16. The artificial muscle of claim 15, wherein the filament is twisted, wound, braided, or meshed.

17. The artificial muscle of claim 13, further comprising a valve positioned on either an inflow side or outflow side of the fluid channel.

18. The artificial muscle of claim 17, wherein the valve is configured to close the fluid channel and allow fluid inflow to expand the flexible casing.

* * * * *